(12) United States Patent
Hardy

(10) Patent No.: US 9,043,906 B2
(45) Date of Patent: May 26, 2015

(54) SYSTEM AND METHOD FOR PREVENTING OPERATION OF UNDETECTED MALWARE LOADED ONTO A COMPUTING DEVICE

(71) Applicant: William Christopher Hardy, Arlington, VA (US)

(72) Inventor: William Christopher Hardy, Arlington, VA (US)

( * ) Notice: Subject to any disclaimer, the term of this patent is extended or adjusted under 35 U.S.C. 154(b) by 0 days.

(21) Appl. No.: 14/088,586

(22) Filed: Nov. 25, 2013

(65) Prior Publication Data
US 2014/0150098 A1   May 29, 2014

Related U.S. Application Data

(60) Provisional application No. 61/730,726, filed on Nov. 28, 2012.

(51) Int. Cl.
  *G06F 21/00* (2013.01)
  *G06F 21/56* (2013.01)
  *G06F 21/12* (2013.01)

(52) U.S. Cl.
  CPC ............ *G06F 21/563* (2013.01); *G06F 21/125* (2013.01)

(58) Field of Classification Search
  CPC .............................. G06F 21/563; G06F 21/125
  USPC .......................................................... 726/22
  See application file for complete search history.

(56) References Cited

U.S. PATENT DOCUMENTS

| | | | | |
|---|---|---|---|---|
| 4,415,965 A | * | 11/1983 | Imazeki et al. | 700/7 |
| 5,126,956 A | * | 6/1992 | Komiya et al. | 700/180 |
| 5,896,522 A | * | 4/1999 | Ward et al. | 703/23 |
| 8,010,773 B2 | * | 8/2011 | Bostanci et al. | 712/226 |
| 8,028,340 B2 | * | 9/2011 | Sebes et al. | 726/26 |
| 2006/0123244 A1 | * | 6/2006 | Gheorghescu et al. | 713/188 |
| 2007/0240217 A1 | * | 10/2007 | Tuvell et al. | 726/24 |
| 2010/0031353 A1 | * | 2/2010 | Thomas et al. | 726/22 |
| 2010/0070953 A1 | * | 3/2010 | Velten et al. | 717/140 |
| 2014/0189249 A1 | * | 7/2014 | Ye et al. | 711/137 |

OTHER PUBLICATIONS

Gourav et al. "Countering Code-Injection Attacks With Instruction-Set Randomization", 2003.*
Jiang, et al., "RandSys: Thwarting Code Injection Attacks with System Service Interface Randomization", http://research.microsoft.com/en-us/people/helenw/papers/randSys.pdf, pp. 1-10.
Barrantes, et al., "Randomized Instruction Set Emulation to Disrupt Binary Code Injection Attacks", 10th ACM Conference on Computer and Communications Security, pp. 281-289, (Oct. 27-31, 2003).
Jun Xu, et al., "Transparent Runtime Randomization for Security", http://www.crhc.illinios.edu/TechReports/pubs/jxu.pdf, pp. 1-24, (Oct. 27-31, 2003).

* cited by examiner

*Primary Examiner* — Mohammad L Rahman
(74) *Attorney, Agent, or Firm* — The Marbury Law Group, PLLC

(57) ABSTRACT

Methods and devices for protecting computing devices against the effects of surreptitiously loaded machine language programs from a malware source. The user defines a pattern of disruption of the sequence of bytes. The user then installs legitimate programs to be run on a particular computing device by loading the original program onto the local hard drive and replacing the program by one to which the pattern of disruption has been applied. Using the user-defined disruption pattern, the computing device can define the transforms necessary to reverse the application of the disruptive pattern. As part of the process the operating system for the computing device is modified to apply transforms that reverse the disruption pattern when executing a program file loaded into RAM.

13 Claims, 8 Drawing Sheets

---

800 Permutation Block Selected by Device Owner: 3 5 4 1 2

801 Implicitly Defined Rows in a Virtual, <any number> x 5 Matrix:
    5(R-1) + 3 5 4 1 2, where R=the row index.

802 Serial Indices of Original Program Frames:

| 1 | 2 | 3 | 4 | 5 | 6 | 7 | 8 | 9 | 10 | 11 | 12 | 13 | 14 | 15 | 16 | 17 |

803 Augmented Program to Create 4 Cycles

| 1 | 2 | 3 | 4 | 5 | 6 | 7 | 8 | 9 | 10 | 11 | 12 | 13 | 14 | 15 | 16 | 17 | NOP | NOP | NOP |

804 Location of Original Frames after Applying Disruption Pattern:

| 3 | 5 | 4 | 1 | 2 | 8 | 10 | 9 | 8 | 7 | 13 | 15 | 14 | 11 | 12 | NOP | NOP | NOP | 16 | 17 |

805 Formula for Calculating Pointers for Program Frames:

$$(5 \times \text{gint}[N/5] - 1) + \{4\ 5\ 1\ 3\ 2\}\ [N \bmod 5],$$

where N is the index in 802 frame address list, gint[X] denotes the least integer greater than or equal to X and X mod Y denotes $X - Y \times (\text{gint}[X/Y]-1)$. Application of this transform shows, for example, that the 17th frame address in order of 802 is 20 in the list 804, since $5 \times \text{gint}[17/5]-1 = 20 - 1 = 15$, 17 mod 5 =2, and the second element of {4 5 1 3 2} is 5.

500 Owner-Specified Index Order Disruption Pattern: 6 4 5 1 3 2
507 Reversal Transform: 4 6 5 2 3 1

| Address in Original File 501 | Computer Word 502 | Address in Conditioned File 503 | Hard Disk Serial Image 504 | Block Written to Allocated RAM | |
|---|---|---|---|---|---|
| | | | | Unconditioned File 505 | Conditioned File 506 |
| 1 | A | 4 | F | D | A |
| 2 | B | 6 | D | F | B |
| 3 | C | 5 | E | E | C |
| 4 | D | 2 | A | B | D |
| 5 | E | 3 | C | C | E |
| 6 | F | 1 | B | A | F |

| Header | Inst 1 | Inst 2 | Inst 3 | Inst 4 | EOF |

1　　　　9　　　　17　　　25　　　　33　　　　41

602: Byte Insertion Disruption Pattern – 3 2 7 6 2 5　　　　　　　EOF
603:

| Header | Inst 1 | | Inst 2 | | Inst 3 | | Inst 4 | | |

800 Permutation Block Selected by Device Owner: 3 5 4 1 2

801 Implicitly Defined Rows in a Virtual, <any number> x 5 Matrix:
5(R-1) + 3 5 4 1 2, where R=the row index.

802 Serial Indices of Original Program Frames:

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|----|----|----|----|----|----|----|----|

803 Augmented Program to Create 4 Cycles

| 1 | 2 | 3 | 4 | 5 | 6 | 7 | 8 | 9 | 10 | 11 | 12 | 13 | 14 | 15 | 16 | 17 | NOP | NOP | NOP |
|---|---|---|---|---|---|---|---|---|----|----|----|----|----|----|----|----|-----|-----|-----|

804 Location of Original Frames after Applying Disruption Pattern:

| 3 | 5 | 4 | 1 | 2 | 8 | 10 | 9 | 8 | 7 | 13 | 15 | 14 | 11 | 12 | NOP | NOP | NOP | 16 | 17 |
|---|---|---|---|---|---|----|---|---|---|----|----|----|----|----|-----|-----|-----|----|----|

805 Formula for Calculating Pointers for Program Frames:

$$( 5 \times gint[N/5] - 1 ) + \{4\ 5\ 1\ 3\ 2\} [N \bmod 5],$$

where N is the index in 802 frame address list, gint[X] denotes the least integer greater than or equal to X and X mod Y is denotes $X - Y \times (gint[X/Y]-1)$. Application of this transform shows, for example, that the 17$^{th}$ frame address in order of 802 is 20 in the list 804, since 5xgint[17/5]-1 = 20 – 1 =15, 17 mod 5 =2, and the second element of {4 5 1 3 2} is 5.

FIG. 8

SYSTEM AND METHOD FOR PREVENTING OPERATION OF UNDETECTED MALWARE LOADED ONTO A COMPUTING DEVICE

BACKGROUND

Programs for devices using binary computers (sometimes referred to herein as "computing devices") are assembled as ordered lists of collections of bytes which we refer to here as frames. Each frame comprises whose content comprises: (1) a binary number identifying a particular computer operation that represents an instruction to the central processing unit (CPU), and (2) address(es) of bytes in random access memory (RAM) specifying data to which that operation is to be applied or the results of the operation are to be stored. Sequences of frames describing computer operations to be executed to implement desired functionality are commonly referred to as machine language, binary, or executable programs. When computer programs are written in a higher level programming language, such programs are created by translation of instructions written in source or assembly code into machine language programs.

Definition of machine language programs varies with the design of the computer's CPU (central processing unit), but the frame structure of a program is always the same, comprising: (1) an ordered list of frames defining the program instructions; (2) conventions that define the structure and format of frames of different types; and (3) an ordered list of relative addresses of bytes naming the position of the first bytes in each instruction frame. When executed, the frames are loaded into RAM, starting at a byte selected by the machine to which the ordered list of relative addresses is added to identify the location of frame starts in RAM. Execution of the program then proceeds by step-by-step retrieval and execution of sequences of instructions which is controlled by pointers that calculate the start address of the next instruction from address of the last executed instruction. For convenience of reference herein, the part of the overall computer operating system that implements the controls that determine how the CPU recognizes, reads, and implements machine language instruction frames will be referred to as the interpreter.

To execute a program, the CPU then steps from instruction frame to instruction frame under the control of the interpreter, which notes the start address of the last instruction executed, calculates the pointer to the next logical instruction in order, locates the start byte, reads the instruction frame, and forwards the encoded instruction to the CPU for execution. To accomplish this, the CPU must execute this process by detection of an initiation sequence which, when loaded, directs the CPU to the first address of the first instruction frame of a program, and a termination sequence, which informs the CPU that the program has been executed, and sets the computer to a state to look for another initiation sequence.

Because of the commonality of this structure, computer programs from external sources can be written into active computer memory, and executed by a call to the associated initiation sequence, or stored for later retrieval by the name of the file that begins with its initiation sequence. This enables users to download executable programs directly from external sources via digital data communications like the Internet. However, this convenience also exposes a computing device to surreptitious transmission of undesirable programs like viruses, Trojan horses, worms, and botnet controllers via data links or other means of covert installation. Such undesirable programs are referred to collectively as computer malware.

Because of the threat of malware, there have been extensive efforts to develop means of detecting and preventing surreptitious attempts to insert such programs into RAM. Most attempts to guard a computing device against malware are designed to prevent download or covert installation of the offending binary programs, or to protect against theft of information when they are successfully installed and activated. The measures that have been developed include, for example: scans for viruses that are effected by prescreening data to be downloaded for evidence of covertly embedded executable programs; encryption of data communications links to prevent remote insertion of such programs; changes in communications software to close possible means of surreptitious insertion of malware; and encryption of data on mass storage media, so that data removed from storage without authorization cannot be interpreted.

SUMMARY

Various embodiments illustrated herein provide for a method of protecting computing device against the effects of surreptitiously loaded machine language programs from any malware source, by devices and methods of ensuring that any computer malware will be automatically disabled, even when attempts to prevent its loading into RAM have been unsuccessful and the malware program has been initiated. In various embodiments, devices and methods are created for enabling users to implement treatments and processes that will automatically force faults in execution of programs that have been loaded for execution without knowledge and permission of the computing device owner.

Machine language programs comprise instruction frames and data frames that are read in an order synchronized by a program initiation frame and governed by instruction frame start address-to-instruction frame start address in a proper sequence determined by the interpreter via calculation of next start address pointers. This means that execution of any program must begin with the initiation frame and maintain accurate pointers to the addresses of the first bytes in each instruction frame in the program by referring to an ordered list of the start bytes for program instruction frames that is either: (a) explicitly created before execution starts; or (b) implicitly identified by "next instruction" directives embedded in machine language instructions and calculated as the program executes.

Since any disruption of that order will result in malfunction of the program as it is executed, this invention calls for creation of "inoculation" codes, in the form of known transformations of a machine language address list to be applied any legitimate program installed by the owner or other authorized person. The interpreter then reverses the effects of the transformation when calculating pointers during program execution. Such reversal assures proper execution of an inoculated program, but will disrupt the proper sequencing of addresses of program instruction frames received from a surreptitious source, thereby rendering the program inoperable.

The capability to inoculate legitimate machine language programs is achieved by application of a process whereby the user/owner of a computing device:

selects readily reversible patterns modification of machine language programs to be known only to that person;

installs legitimate programs by writing the conventionally encoded binary file to the mass storage medium from which machine language programs are loaded into RAM;

applies the disrupting pattern to the binary file and re-writes it to the storage medium under its conventional file name; and causes any program loaded into RAM to be executed in consonance with the order of execution created by application of the disrupting pattern.

As a result of this process, a malware program installed or loaded without first being conditioned by application of the disruption pattern specified by the system owner will not function properly when execution is attempted, thereby thwarting the intruder's intent, even when the installation and activation of the malware program is not detected,

DESCRIPTION OF THE DRAWINGS

The accompanying drawings, which are incorporated herein and constitute part of this specification, illustrate exemplary aspects of the various embodiments illustrated herein. Together with the general description given above and the detailed description given below, the drawings serve to explain features of the invention.

FIG. 5 is a block diagram comparing the loading and execution of an inoculated program to a program that has not been inoculated according to an embodiment.

FIG. 6 is a block diagram illustrating an application of a disruptive pattern to a file loading process according to an embodiment.

FIG. 8 is a block diagram illustrating a process for defining a disruptive pattern according to an embodiment.

DETAILED DESCRIPTION

Figure 1:
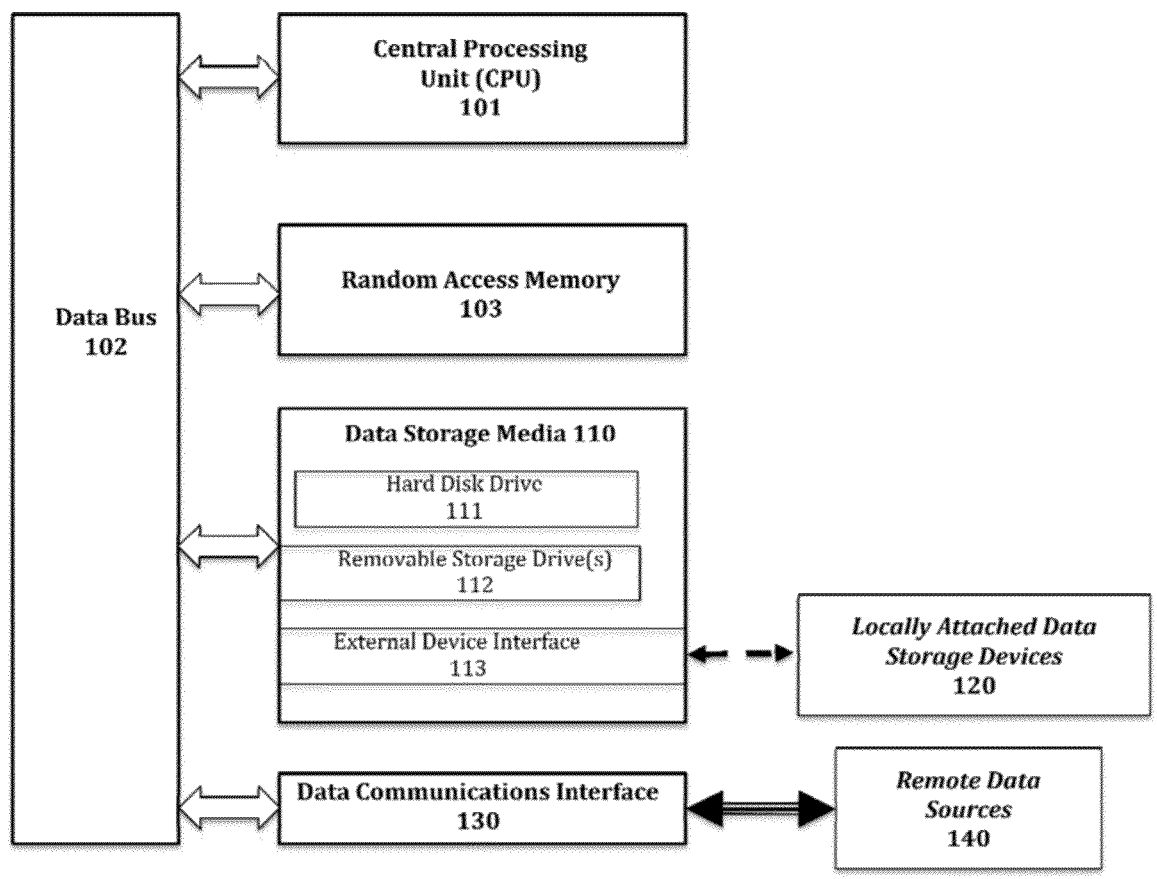
FIG. 1 illustrates a generic functional description of the organization of a modem digital computing device as is know in the art.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

In the various embodiments illustrated herein, computer malware that has been surreptitiously installed on computing device by unauthorized persons is automatically disabled by specifying readily reversible rules for modifying the logic by which frames of authorized programs retrieved from mass storage and written into RAM are read for execution. This activity is effected within a computing device structure with the components shown in FIG. 1. Within that structure the original specification of machine language programs is created outside of the computing device and inserted into that system via attachment of binary data storage media (120), such as a flash drive or CD through an external device interface (113), or from remote sources (140), such as Internet web sites or foreign computers, via a data communications interface (130). As ingested, the binary files are transmitted via a data bus (102) either directly into the computing device's RAM (random access memory) (103), or into the computing device's storage device, such as local hard disk drive (111), for later retrieval and transmission into the RAM (103). When executed by the computer central processing unit (101), the machine language instructions are read from RAM (103) and results of operations are written to specified addresses (103) via the data bus (102).

Figure 2:
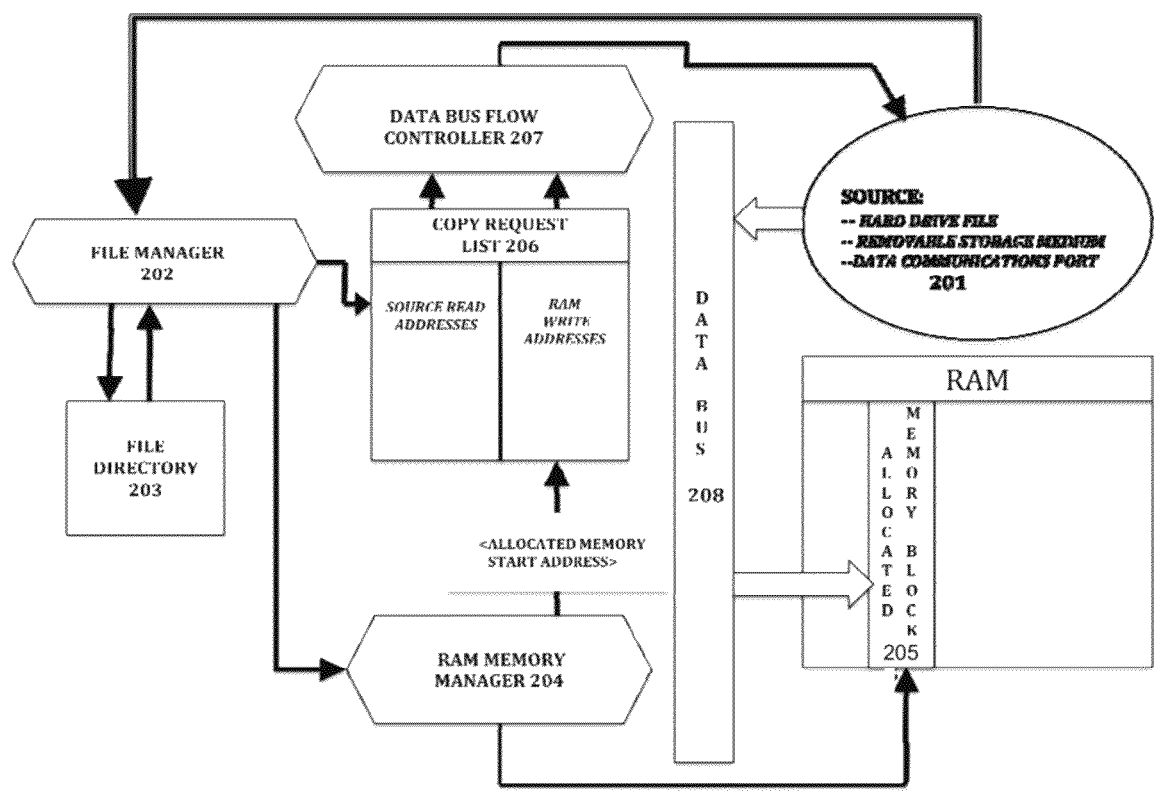
FIG. 2 illustrates a loading process by which machine language programs to be run on a digital computing device are loaded for execution as is known in the art.

As illustrated in FIG. 2 the process of writing a machine language program into RAM is governed by three operating system programs:

File manager (202), which organizes and maintains information on the location of data from various different sources (201) available to the computing device in a file directory (203). Such data are variously stored on mass storage media, or, in the case of data from communications ports, written into temporary storage locations, usually referred to as boilers.

RAM Memory Manager (204), which acts on information from the File Manager to reserve segments of RAM for use in particular purposes when associated processes are activated.

Data Bus Flow Controller (207) which schedules and effects transfer of data from various different sources (201) into their allocated memory spaces in RAM (205) via the data bus (208).

A feature of the process illustrated in FIG. 2 is the creation of the copy request list (206). The copy request list is created by first reading information about the source file from the file directory (203) to identify the location, in order, of the bytes in the source file, in order to control the transfer of data via the data bus (208) from the source (201) to its allocated memory space (205).

The destination addresses of each byte from a source file must then be synchronized to be consistent with the contiguous bytes allocated for that file by the RAM Memory Manager (204). As shown in FIG. 2 this requires as minimum information the address of the start byte in the allocated memory block (205) to which the file is to be written. The result of this synchronization process is a copy request list (206) detailing for the data base flow controller (207) which determines where the source file is to be written into the allocated memory block (205).

When the data to be transferred from the source file to the allocated memory block is a binary file representing a machine language program, the synchronization process must produce a one-for-one mapping that identically preserves the serial order of the bytes in the program file. Otherwise, the internal addresses or meanings of instructions in program frames will be corrupted, preventing the proper execution of the program.

Figure 3:
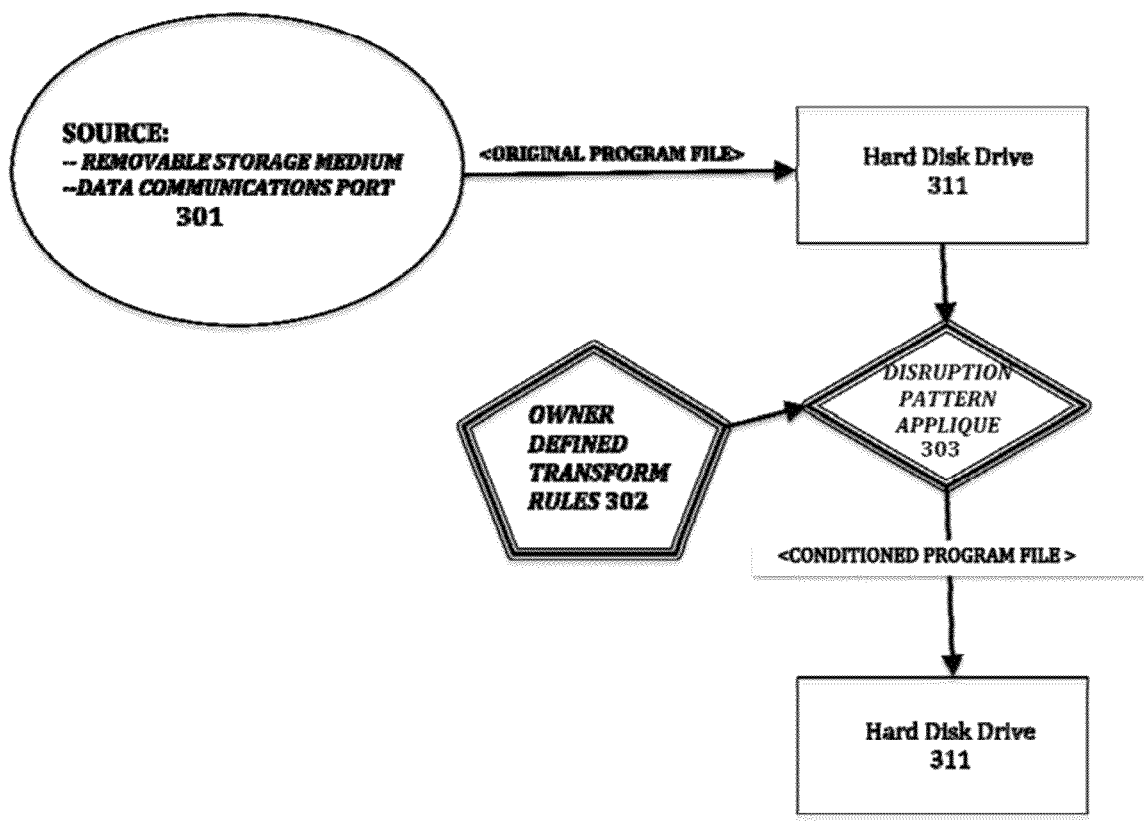
FIG. 3 is a block diagram illustrating a file inoculation installation procedure according to an embodiment.

In an embodiment illustrated in FIG. 2, the interpreter is modified to admit additional specifications for changing the sequence with which addresses of instruction frames in RAM are to be read during execution (206). The application of this facility to inoculate program files is illustrated in FIG. 3. When presented with access to a machine language program file whose installation on a particular computing device is desired by its owner, the program file is first written to local hard disk drive (311). Then, based on address transform rules (302) specified by the computing device owner/user, the legitimate program file is transformed by application of the disruption pattern created by those rules (303) and re-written under the same file name back onto the local hard drive (311).

Figure 4:
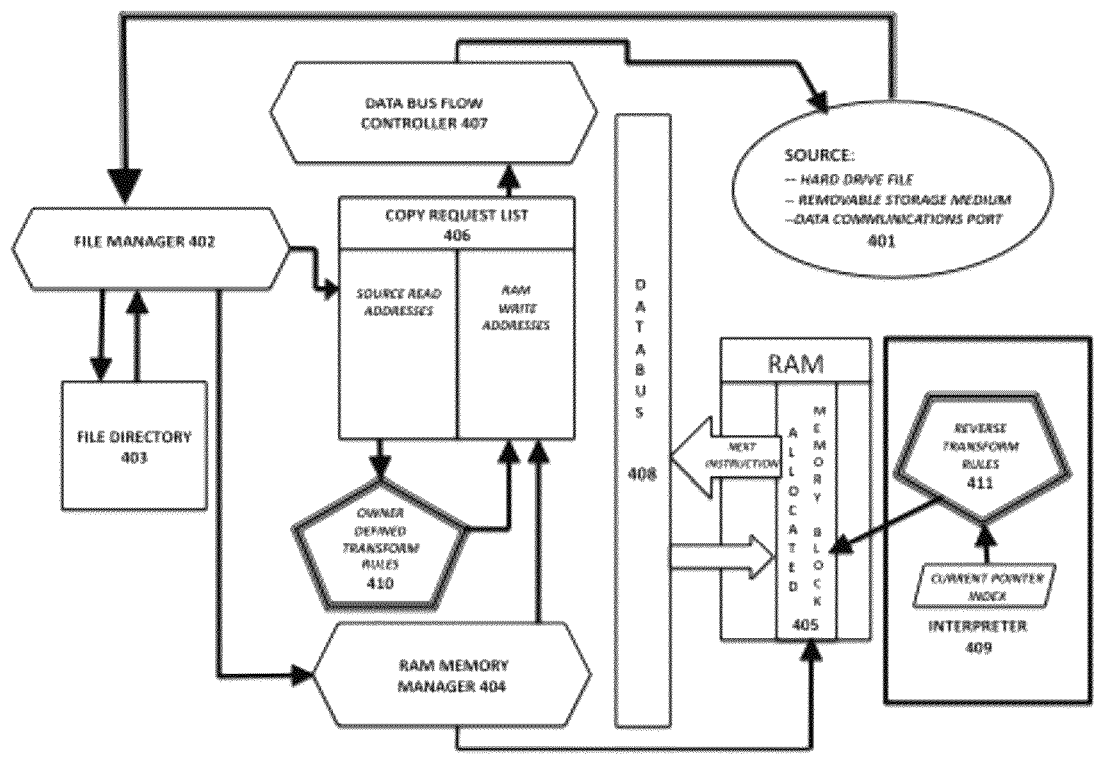
FIG. 4 is a block diagram illustrating a process by which frames of machine language programs loaded into RAM for execution are read after inoculation to implement their sequential execution according to an embodiment.
Figure 7:
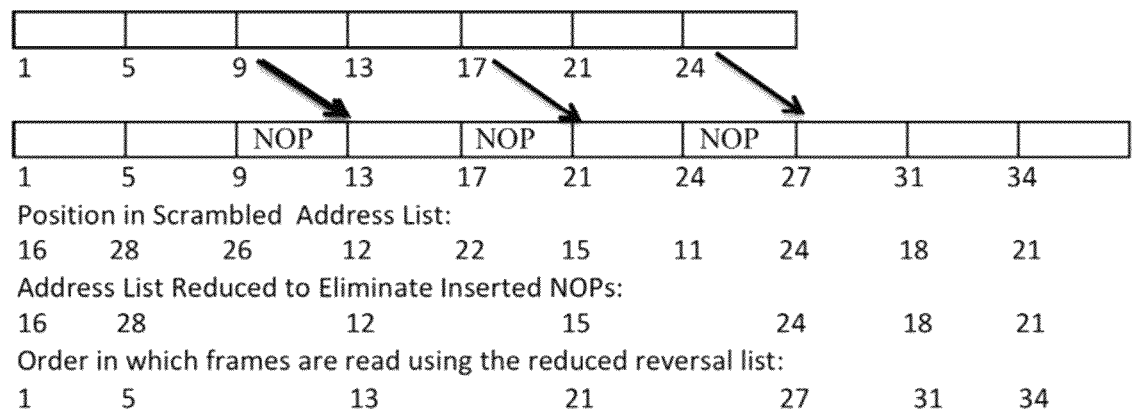
FIG. 7 is a block diagram illustrating an application of a disruptive pattern to a file loading process created by index permutation after insertion of NOPS according to an embodiment.

Referring now to FIG. 4 the embodiments are implemented by modification of the process by which machine language programs loaded into allocated memory blocks (405) are read. When a legitimate program is loaded from its source (401) it becomes available for retrieval and loading via instructions to the file manager (402) via instructions to the file directory. To condition the file for "inoculated" execution, knowledge of the disruption pattern (410) is applied to create a differently configured file that will be retrieved upon request and written into RAM memory (405) allocated for the program by the memory manager (404). Knowledge of the sequence of frames created by the disruption pattern then enables the operating system interpreter (409) to execute transforms (411) that reverse its effects, resulting in the proper synchronization between the machine language program file and its image in the allocated memory (405). At the same time, loading of any program file from any source that has not been conditioned for the owner's device will result in a corrupted image in RAM that will not execute as planned.

In one embodiment, illustrated in FIG. 5, such inoculation against malware is implemented by creating a list of the indices of instruction frames in a machine language program (500) that is deliberately scrambled to create an out-of-order sequence. After a legitimate program is installed by writing it as a binary file on the target computing device (501), the sequence of instruction/data frames is then re-ordered in accordance with the pre-defined list (503). Machine language programs loaded into RAM on the protected device are then governed by an intermediate application that forces the execution to follow the sequence specified by the pre-defined list (500), to produce a conditioned file (503). On execution, the instruction frames are read in the order specified by the reverse transform (507) rather than the normal, linear order of indices. As shown by the equivalence of (502) and (506) application of the transform rules reversing the effects of application of the disruption pattern to the disrupted sequence written into the allocated memory, replicates the original, pre-conditioned sequence of words. As shown in the comparison of (502) and (505), however, the sequence of words in a machine language program loaded into RAM without the owner-specified conditioning would not be executed in the order demanded by the logic of the program.

In another embodiment, illustrated in FIG. 6, the inoculation is achieved by appending a number of extra bytes to each frame of a binary program. In this case, the owner specified disruption pattern is a sequence of numbers indicating the number of meaningless bytes to be inserted between contiguous program instruction frames. Application of the pattern in (602) results in an image of the notional program with the structure at (601) shown at (603). The transform rules in (410) mandate addition of the next integer in the specified pattern to the destination RAM address to obtain the pointer for the next program frame. As a result the interpreter then skips over the appropriate number of bytes for each insertion, retrieving the original sequence of frames in a conditioned file, but disrupting or destroying the program instructions and ultimately generating a pointer out of range when the machine language program is not conditioned.

In yet another embodiment, the inserted bytes are extra frames within a machine language program are NOP (no operation) instructions for that language, which tell the interpreter to do nothing and move on to the next frame. The positions of the NOP frames within the treated program are then recorded, and their corresponding indices are deleted from the list of instruction start addresses that is to be read by the interpreter. On execution of the program each properly encoded instruction frame will be executed in the correct order, while instruction frames loaded from files that have not been conditioned will automatically skip frames, thereby causing program faults.

In yet another embodiment, illustrated in FIG. 1 the disruption pattern used to "inoculate" the device includes both the insertion of NOP frames and permutation of the frame indices to create a disruption vector, followed by elimination from that vector of all indices of frames associated with the inserted NOP frames.

In still another embodiment, illustrated in FIG. 8, the disruption pattern is defined by a vector of integers is calculated by reference to a virtual matrix whose rows repeat a permutation of the number of elements in the column. In the example illustrated in FIG. 8, the basis for defining the disruption pattern is a permutation of five integers (800). This definition can be used to generate a matrix of any number of rows that can be unwound by the formula in (801) to generate a disruption pattern of any length. When the original program comprises a number of frames that is not a multiple of the number of columns of the matrix (5 in the example), like (802) the program can be supplemented by an appropriate number NOP insertions to make the number of byes in the instruction frames an even multiple of the number of columns of the matrix (803). The resultant matrix (4×5) in this example can then be linearized by the formula (801) to create a disruption pattern of the right size for (802). Then, since the inversion of the pattern (800) is 4 5 1 3 2, an inverse transform formula (805) can be defined to calculate the pointers in (804) for the program for reading the proper order of the frames in the original program as augmented (803). Implementation of this method enables the owner/authorized user to define a the disruption pattern as a permutation of a relatively small number of indices and define transforms that use that key to "inoculate" machine language programs of any length and define the inverse transforms used by the interpreter as calculations, rather than long look-up tables.

In these exemplary embodiments: The device owner/authorized user creates a list of owner-selected integers defining the transform rules as specified or calculated indices defining the sequence in which byte addresses read in serial order from a machine language program file will be written into RAM.

A further exemplary embodiment provides for a program that can be used by the owner/user to load that list from a volatile storage device, convert a legitimate machine language program for use on the owner's device by application of that disruption pattern. A further exemplary embodiment provides for modification of the operating system for the owner's computing device to apply transform rules that reverse the disorder created by the disruption pattern appliqué.

In sum, the various embodiments illustrated herein provide for a method of protecting computing devices against the effects of surreptitiously loaded machine language programs from a malware source, whereby:

The user defines a pattern of disruption of the sequence of bytes in the file describing a machine language program.

The user then installs legitimate programs to be run on a particular computing device loading the original program onto the local hard drive and replaces the program by one to which the pattern of disruption has been applied.

As part of the process the operating system for the computing device is modified to apply those transforms when loading a program file into RAM.

Using the user-defined disruption pattern, the computing device then defines and establishes capabilities to effect transforms necessary to reverse the application of the disruptive pattern.

In the various embodiments illustrated herein, the pattern of disruption is defined and created by and known only to, the owner or authorized users of a device by specification of an explicit vector of integers defining the difference between serial indices of addresses of bytes in a machine language program and the serial indices of bytes in program in which the order of frames has been modified, together with a companion vector, which when read serially reverses the effects of the disruption pattern to capture the original sequential order of frames as the program is executed in RAM.

The vector of integers defines permutations of blocks of serial indices of addresses of bytes in a machine language program or deletion of indices of frames that are not to be read was the machine language program executes. The vector of integers represents a possibly different number of extra bytes to be inserted into a machine language program after each of a number of consecutive program instruction frames.

The vector of integers further represents a possibly different number of extra NOP instruction frames to be inserted after each of a number of consecutive program instruction frames in a machine language program.

The vector of integers is further calculable as the entries in a virtual matrix all of whose rows repeat a permutation of the consecutive integers representing the indices of the matrix columns.

The number of bytes inserted into an original machine language program will force the pointer for loading that program in RAM to read an address outside of the range of addresses in the original file when that file has not been conditioned to reflect the effects of spurious byte insertion.

The bytes inserted into an original machine language program are NOP (no operation) frames whose indices in the original file will be removed from the vector of integers used for program execution, In an embodiment, a computing device is rendered malware resistant by modifying its operating system that transfers a machine language programs from its source to allocated RAM memory to execute the machine language program according to an order defined by a changeable vector of integers, which integers define the sequence in which frames in a machine language program are to be read from contiguous, serially ordered addresses of bytes in RAM. The operating system as modified utilizes an interpreter of that vector to determine the mapping between addresses of bytes in a machine language program and addresses of bytes in the memory allocated to that program in RAM.

While certain procedures are described, the results of the procedures are devices that are substantially immune from computer malware. As such, manufacturers of computing devices may include this malware inoculation capability as part of the operating systems of each computing device. As such, devices are created that are resistant to commuter malware.

While embodiments of the present invention have been described above, it should be understood that they have been presented by way of examples that illustrate the concepts on which the present invention are based, and not as limitations.

The embodiments described above may be implemented in any of a variety of computing devices such as desktops, laptop; tablet computers and the like. The foregoing method descriptions are provided merely as illustrative examples and are not intended to require or imply that the processes of the various embodiments must be performed in the order presented. Skilled artisans may implement the described functionality in varying ways for each particular computer operating system, but such implementation decisions should not be interpreted as causing a departure from the scope of the present invention. Words such as "thereafter," "then," "next," etc. are not intended to limit the order of the processes; these words are simply used to guide the reader through the description of the methods. Further, any reference to claim elements in the singular, for example, using the articles "a," "an" or "the" is not to be construed as limiting the element to the singular.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the scope of the invention, Thus, the present invention is not intended to be limited to the embodiments shown herein, and instead the claims should be accorded the widest scope consistent with the principles and novel features disclosed herein.

What is claimed is:

1. A method of protecting a computing device against malware, the method comprising:
   defining a pattern of disruption of a sequence of bytes of a machine language program;
   applying the pattern of disruption to one or more selected machine language programs to produce one or more modified selected programs;
   determining one or more transforms necessary to reverse the application of the disruptive pattern; and
   applying the one or more transforms to machine language programs loaded into a read only memory (RAM) of the computing device, whereby only the one or more selected programs will execute correctly;
   wherein defining the pattern of disruption comprises receiving from a user of the computing device a specification of an explicit vector of integers defining the difference between serial indices of addresses of bytes in the one or more selected programs and serial indices of bytes in the one or more modified selected programs.

2. The method of claim 1, wherein the explicit vector of integers defines permutations of blocks of serial indices of addresses of bytes in the one or more selected programs.

3. The method of claim 2, wherein the explicit vector of integers is calculated by reference to a virtual matrix whose rows repeat a permutation of a number of elements in a column.

4. The method of claim 1, wherein the explicit vector of integers represents a same or different number of extra bytes to be inserted into the one or more selected programs after each of a number of consecutive program instruction frames.

5. The method of claim 4, wherein the explicit vector of integers represents a same or different number of no operation (NOP) instruction frames to be inserted after each of a number of consecutive program instruction frames into the one or more selected programs.

6. The method of claim 1, wherein the one or more transforms exclude any indices associated with no operation instructions.

7. A malware resistant computing device comprising:
   a processor; and
   a read only memory (RAM),
   wherein the processor comprises instructions for performing operations comprising:

defining a pattern of disruption of a sequence of bytes of a machine language program;

applying the pattern of disruption to one or more selected machine language programs to produce one or more modified selected programs;

determining one or more transforms necessary to reverse the application of the disruptive pattern; and applying the one or more transforms to machine language programs loaded into the RAM of the computing device, whereby only the one or more selected programs will execute correctly, wherein defining the pattern of disruption comprises receiving from a user of the computing device a specification of an explicit vector of integers defining the difference between serial indices of addresses of bytes in the one or more selected programs and serial indices of bytes in the one or more modified selected programs.

8. The computing device of claim 7, wherein the explicit vector of integers defines permutations of blocks of serial indices of addresses of bytes in the one or more selected programs.

9. The computing device of claim 8, wherein the explicit vector of integers is calculated by reference to a virtual matrix whose rows repeat a permutation of a number of elements in a column.

10. The computing device of claim 7, wherein the explicit vector of integers represents a same or different number of extra bytes to be inserted into the one or more selected programs after each of a number of consecutive program instruction frames.

11. The computing device of claim 10, wherein the explicit vector of integers represents a same or different number of no operation (NOP) instruction frames to be inserted after each of a number of consecutive program instruction frames into the one or more selected programs.

12. The computing device of claim 7, wherein the one or more transforms exclude any indices associated with no operation instructions.

13. A method of rendering a computing device malware resistant, the method comprising:

receiving by the computing device a changeable vector of integers defining the order in which frames in a machine language program in read only memory are to be executed, wherein the changeable vector of integers is received from a user of the computing device and defines the difference between serial indices of addresses of bytes in a selected program and serial indices of bytes in a modified version of the selected program; and modifying an operating system of the computing device to execute the machine language program in the defined order.

* * * * *